(12) United States Patent
Fang (10) Patent No.: US 11,555,544 B2
(45) Date of Patent: Jan. 17, 2023

(54) BUTTERFLY VALVE

(71) Applicant: HOREN CORTP CO., LTD., Shanghai (CN)

(72) Inventor: Zhengwei Fang, Shanghai (CN)

(73) Assignee: HOREN CORTP CO., LTD., Shanghai (CN)

( * ) Notice: Subject to any disclaimer, the term of this patent is extended or adjusted under 35 U.S.C. 154(b) by 0 days.

(21) Appl. No.: 17/294,005

(22) PCT Filed: Nov. 13, 2019

(86) PCT No.: PCT/CN2019/117923
§ 371 (c)(1),
(2) Date: May 14, 2021

(87) PCT Pub. No.: WO2020/098681
PCT Pub. Date: May 22, 2020

(65) Prior Publication Data
US 2022/0003322 A1    Jan. 6, 2022

(30) Foreign Application Priority Data

Nov. 14, 2018 (CN) .......................... 201811353347.9

(51) Int. Cl.
*F16K 1/226* (2006.01)
*F16K 1/36* (2006.01)
(Continued)

(52) U.S. Cl.
CPC .............. *F16K 1/2263* (2013.01); *F16K 1/36* (2013.01); *F16K 1/42* (2013.01); *F16K 27/0218* (2013.01)

(58) Field of Classification Search
CPC . F16K 1/2263; F16K 1/36; F16K 1/42; F16K 27/0218
See application file for complete search history.

(56) References Cited

U.S. PATENT DOCUMENTS 3,241,806 A * 3/1966 Snell, Jr. ............... F16K 1/2265
    251/368
3,656,712 A    4/1972 Bertrem
(Continued)

FOREIGN PATENT DOCUMENTS

CN    205013709 U    2/2016
CN    107477193 A    12/2017
(Continued)

OTHER PUBLICATIONS

International Search Report and Written Opinion issued in PCT/CN2019/117923, dated Feb. 7, 2020, with English translation.
(Continued)

*Primary Examiner* — Patrick C Williams
(74) *Attorney, Agent, or Firm* — Hamre, Schumann, Mueller & Larson, P.C.

(57) ABSTRACT

The present invention discloses a butterfly valve including: a valve body, an inner valve seat, a valve core, a valve stem and at least one positioning ring. The valve body has an inlet end, an outlet end, and an axial passage communicating with the inlet end and the outlet end. A valve stem mounting hole is provided between the inlet end and the outlet end in the valve body. The valve body further is provided with a valve seat mounting portion in the axial passage at a position corresponding to the valve stem mounting hole. The inner valve seat is fixedly mounted to the valve seat mounting portion, which is cylindrical and is provided with radial through hole in the side wall corresponding to the valve stem. the valve core is plate-shaped and mounted in the inner valve seat, a radial through hole is provided therein. The valve stem passes through the valve stem mounting hole, the radial through hole of the inner valve seat and the radial through hole of the valve core. The positioning ring is mounted in the valve body at an axial side of the inner valve (Continued)

seat and form a hermetic connection with the inner valve seat. The butterfly valve of this invention has good tightness.

10 Claims, 10 Drawing Sheets

(51) Int. Cl.
 *F16K 1/42* (2006.01)
 *F16K 27/02* (2006.01)

(56) References Cited

U.S. PATENT DOCUMENTS

| | | | | |
|---|---|---|---|---|
| 4,067,534 | A | * | 1/1978 | Frey .................... B29C 66/55 285/915 |
| 4,103,866 | A | * | 8/1978 | Robinson ............ F16K 27/0218 251/151 |
| 4,348,006 | A | * | 9/1982 | Schmitt ............... F16K 27/0218 251/366 |
| 4,998,708 | A | * | 3/1991 | Pavanel ................ F16K 1/2263 251/317 |
| 5,360,030 | A | * | 11/1994 | Sisk .................... F16K 27/0218 251/308 |
| 5,370,148 | A | * | 12/1994 | Shafer ................. F16K 27/0218 137/315.23 |
| 5,482,252 | A | * | 1/1996 | Kamezawa ........... F16K 1/2265 251/367 |
| 6,142,173 | A | * | 11/2000 | Bekeredjian .......... F16K 1/2265 251/306 |
| 9,903,496 | B2 | * | 2/2018 | Abouelleil .......... F16K 27/0218 |
| 2011/0214288 | A1 | * | 9/2011 | Dalluge .............. F16K 27/0218 29/700 |

FOREIGN PATENT DOCUMENTS

| | | |
|---|---|---|
| CN | 109386620 A | 2/2019 |
| CN | 209587161 U | 11/2019 |
| DE | 670327 C | 1/1939 |
| DE | 2818811 A1 | 11/1979 |
| JP | S5394328 U | 8/1978 |
| JP | H0189669 U | 6/1989 |
| JP | H10311439 A | 11/1998 |
| JP | H1113898 A | 1/1999 |
| JP | 2001099334 A | 4/2001 |
| JP | 2008144836 A | 6/2008 |
| JP | 2018013165 A | 1/2018 |

OTHER PUBLICATIONS

The extended European search report issued in European Application No. 19884930.9, dated Jan. 12, 2022, 11 pages provided.
Notice of Reason for Refusal issued in corresponding Japanese application No. 2021-525762, dated Aug. 2, 2022, with machine translation.

* cited by examiner

BUTTERFLY VALVE

CROSS REFERENCE TO RELATED APPLICATIONS

This application claims the priority of the Chinese application No. 201811353347.9, titled "Butterfly Valve" filed on Nov. 14, 2018, the contents of which are incorporated by reference herein.

TECHNICAL FIELD

The present invention relates to a valve, in particular to a butterfly valve.

TECHNICAL BACKGROUND

The opening way of the existing butterfly valve is that the middle shaft of the valve core rotates, which drives both sides of the valve core to rotate to open, and the tightness of the valve is usually poor. Especially when the butterfly valve is mainly made of plastic, its tightness will be worse after high temperature sterilization.

SUMMARY

The object of the present invention is to provide a butterfly valve with excellent tightness.

In order to achieve the above object, the present invention provides a butterfly valve, comprising:

a valve body having an inlet end, an outlet end, and an axial passage communicating with the inlet end and the outlet end, wherein the valve body is provided with a valve stem mounting hole in a radial direction between the inlet end and the outlet end, the interior of the valve body is provided with a valve seat mounting portion at a position corresponding to the valve stem mounting hole;

an inner valve seat fixedly mounted to the valve seat mounting portion, wherein the inner valve seat is cylindrical, and a radial through hole corresponding to the valve stem mounting hole is provided with in a side wall of the inner valve seat;

a valve core being a plate-shaped member and mounted in the inner valve seat, wherein a radial through hole is provided inside the plate-shaped member;

a valve stem passing through the valve stem mounting hole, the through hole of the inner valve seat and the through hole of the valve core successively; and at least one positioning ring mounted at an axial side of the inner valve seat inside the valve body and forming a hermetic connection with the inner valve seat.

In one embodiment, the positioning ring is arranged such that the valve body and the inner valve seat form a hermetic connection under the action of the positioning ring.

In one embodiment, the positioning ring is arranged to exert a squeezing force to the inner valve seat.

In one embodiment, a hermetic connection is formed between the inner valve seat and the valve body.

In one embodiment, the valve body is provided with a sealing surface, the inner valve seat is provided with a sealing rib cooperating with the sealing surface of the valve body, the inner valve seat is also provided with a sealing surface, and the positioning ring is provided with a sealing rib cooperating with the sealing surface of the inner valve seat.

In one embodiment, a shoulder is provided on the outer peripheral surface of the positioning ring, and a barb cooperating with the shoulder is provided inside the valve body.

In one embodiment, the butterfly valve is provided with two positioning rings, which are respectively hermetically connected with the front side and the rear side of the inner valve seat.

In one embodiment, the valve body is cylindrical and has a front segment, a middle segment and a rear segment, wherein the inner diameter of the internal passage of the middle segment is smaller than that of the front segment and the rear segment, and sealing surfaces formed by shoulders are respectively provided between the internal passage of the middle segment and the internal passage of the front segment and between the internal passage of the middle segment and the internal passages of the rear segment respectively.

In one embodiment, the valve body is provided with a sealing surface, the inner valve seat is provided with the positioning rings on both axial sides, and the inner valve seat is cylindrical and has a rear side end and a front side end, wherein both the rear side end and the front side end are provided with flanges protruding radially outward, an annular surface on one side of each of the flanges forms a sealing contact with sealing surfaces of the valve body respectively, and the other side of the flange forms a sealing contact with the sealing surface of the positioning ring.

In one embodiment, a sealing rib is provided on the annular surface of the flange that forms the sealing contact with the valve body, and the sealing surface facing toward the flange of the positioning ring is provided with sealing ribs.

In one embodiment, a metal pin extending along the axial direction of the valve stem is inserted inside the valve stem.

In one embodiment, the valve is further provided with an outer valve seat mounted against the positioning ring.

In one embodiment, the valve body, the inner valve seat, the valve core, and the positioning ring are all made of plastic.

The beneficial effects of the present invention are that the transmission parts are few, the manufacturing process is good, the structure is simple, and the space utilization is high, so that the valve can be minimized. The opening torque is small and the tightness is good.

BRIEF DESCRIPTION OF THE DRAWINGS

FIGS. 3(*a*) and 3(*b*) are perspective views of the front positioning ring and the rear positioning ring of the butterfly valve according to the present invention respectively.

FIGS. 4(*a*) and 4(*b*) are perspective views of the valve body of the butterfly valve according to the present invention viewed from the front side and the rear side, respectively.

FIG. 5(*a*) is a perspective view of the positioning rod and handle of the butterfly valve according to the present invention.

FIGS. 5(*b*) and 5(*c*) are a perspective view of the metal pin inside the positioning rod and a longitudinal cross-sectional view of the positioning rod respectively.

FIGS. 6(*a*) and 6(*b*) are a perspective view and an axial cross-sectional view of the valve core of the butterfly valve according to the present invention respectively.

DETAILED DESCRIPTIONS

The preferred embodiment of the present invention will be described in detail with reference to the accompanying drawings, so that the purposes, features and the advantages of the invention can be more clearly understood. It should be understood that the embodiments shown in the accompanying drawings are not intended to limit the scope of the present invention, but illustrate the essential spirit of the technical solution of the present invention.

In the following description, for purposes of illustrating the various disclosed embodiments, some specific details are set forth to provide a thorough understanding of the various disclosed embodiments. However, those skilled in the art will recognize that embodiments may be practiced without one or more of these specific details. In other instances, well-known devices, structures, and techniques associated with the present application may not be shown or described in detail to avoid unnecessarily obscuring the description of the embodiments.

Unless otherwise desired by context, throughout the description and claims, the terms "comprising" and variations thereof, such as "including" and "having", are to be construed as non-exclusive, i.e., to be construed as "including, but not limited to"

Throughout the specification "an embodiment" or "one embodiment" means that a particular feature, structure, or characteristic described in combination with the embodiment is involved in at least one embodiment. Therefore, the presence of "In one embodiment" or "in one embodiment" at various locations throughout the description need not all refer to the same embodiment. Additionally, particular features, structures, or features may be combined in any manner in one or more embodiments.

As used in the specification and appended claims, the singular forms "a" and "the" include plural references unless the context clearly dictates otherwise. The term "or" be usually used in its meaning including "and/or" unless the context clearly dictates otherwise.

In the following description, for clarity of illustration of the structure and mode of operation of the present invention, various directional terms will be used to describe the present invention, but words such as "front", "rear", "left", "right", "outer", "inner", "outward", "inward", "upper", "lower", and the like, should be understood as convenient terms and should not be construed as limiting terms.

Figure 1:
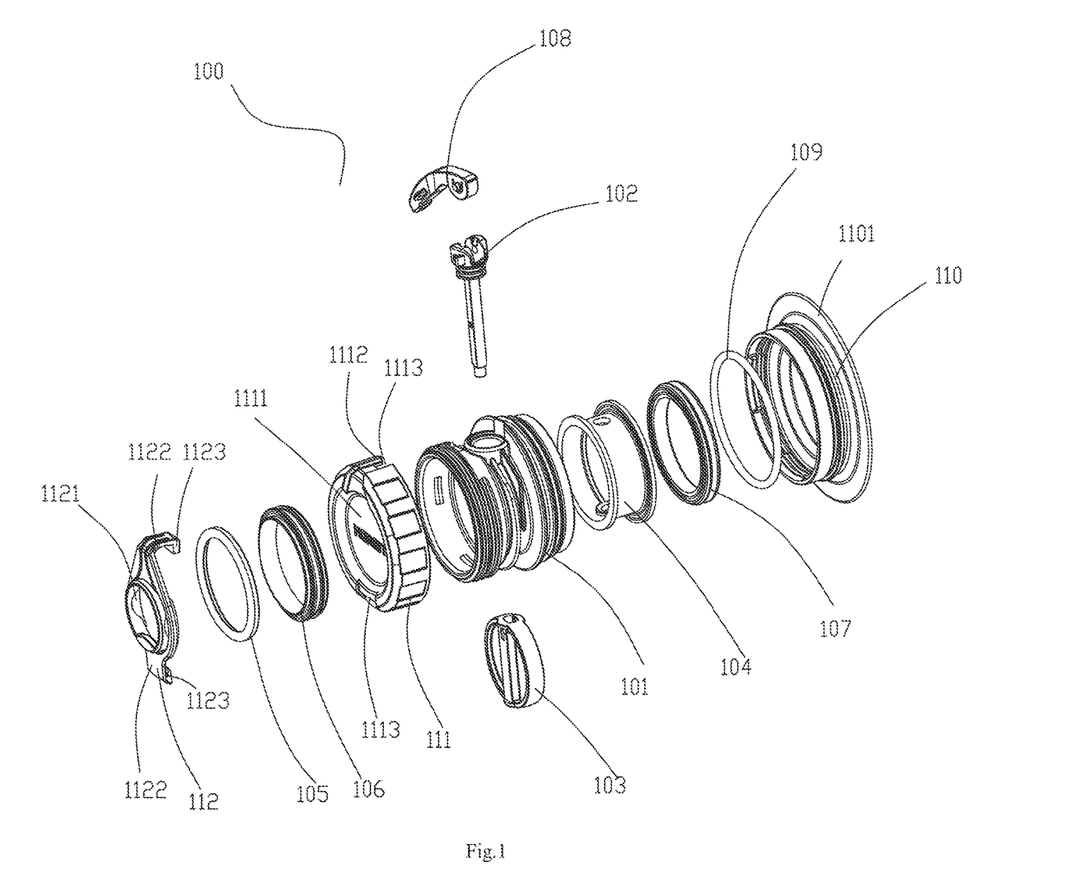
FIG. 1 is an exploded schematic view of the butterfly valve according to the present invention.
Figure 2:
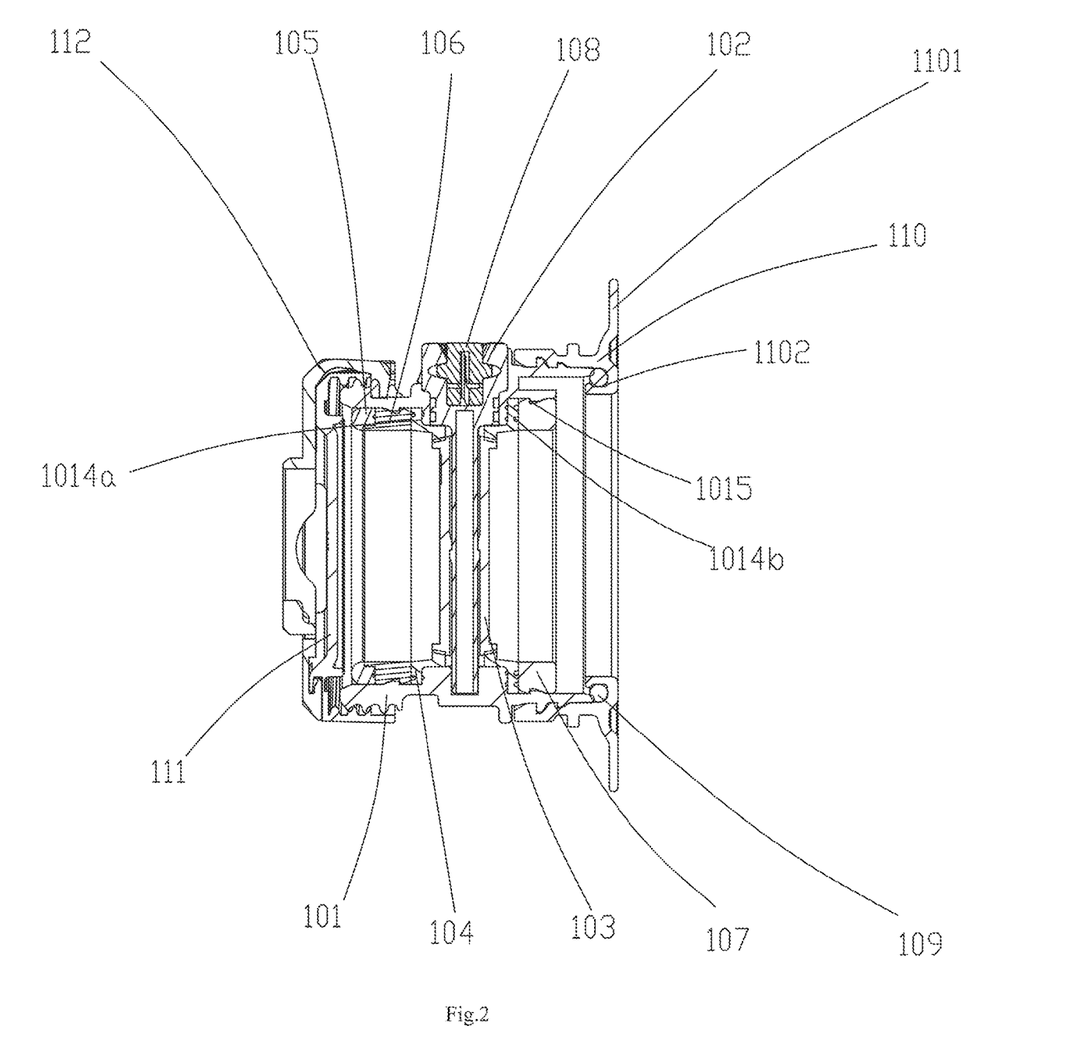
FIG. 2 is an axial cross-sectional view of the butterfly valve according to the present invention.

Firstly, the butterfly valve 100 according to the present invention will be described in detail with reference to the accompanying drawings. The butterfly valve 100 is generally used in the outlet of a container, and is generally made of plastic material. In the following, as shown in FIGS. 1 and 2, the butterfly valve 100 includes: a valve body 101, a valve stem 102, a valve core 103, an inner valve seat 104, an outer valve seat 105, a front positioning ring 106, a rear positioning ring 107 and handle 108. Referring to FIG. 2, the inner valve seat 104 is mounted inside the valve body 101. The valve core 103 is mounted inside the inner valve seat 104, and the front positioning ring 106 and the rear positioning ring 107 are located at the front and rear sides of the inner valve seat 104 respectively. It should be understood that only the front positioning ring 106 or only the rear positioning ring 107 may be provided without departing from the scope of the present invention. Here, the positioning rings 106 and 107 are parts independent of the valve body 101. It can be made by material which can be easily replaced or made of more suitable materials. The outer valve seat 105 is arranged on the front side of the front positioning ring 106 (if any) in the valve body 101. The valve cover 111 is provided on the front side of the valve body 101. A flange 110 is further mounted on the rear side of the valve body 101. A flange sealing ring 109 is provided between the valve body 101 and the flange 110. A tamper-proof buckle 112 may be mounted on the front side of the valve cover 111.

Figure 8A:
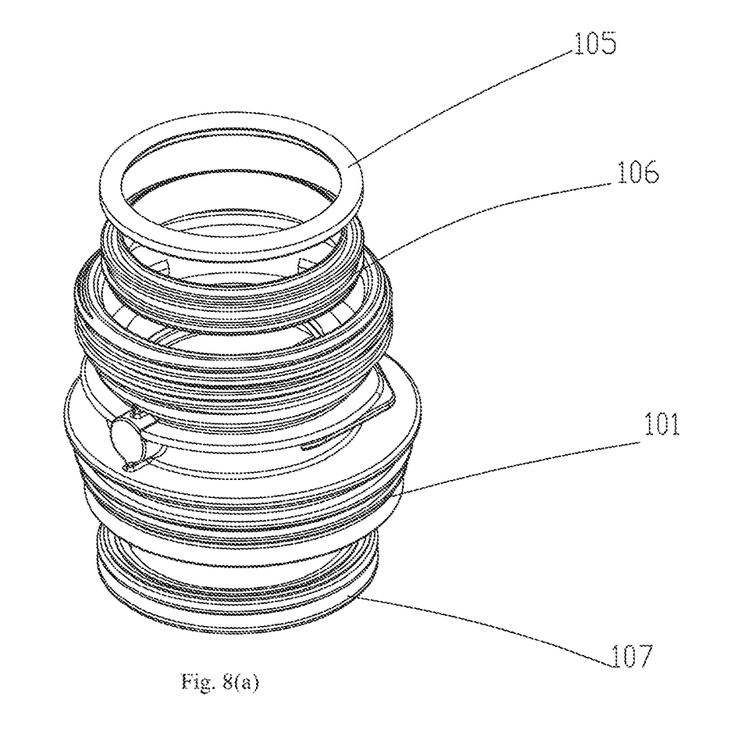
FIG. 8(a) is an exploded perspective view of the valve body, front positioning ring, rear positioning ring, and inner valve seat of the butterfly valve according to the present invention.
Figure 8B:
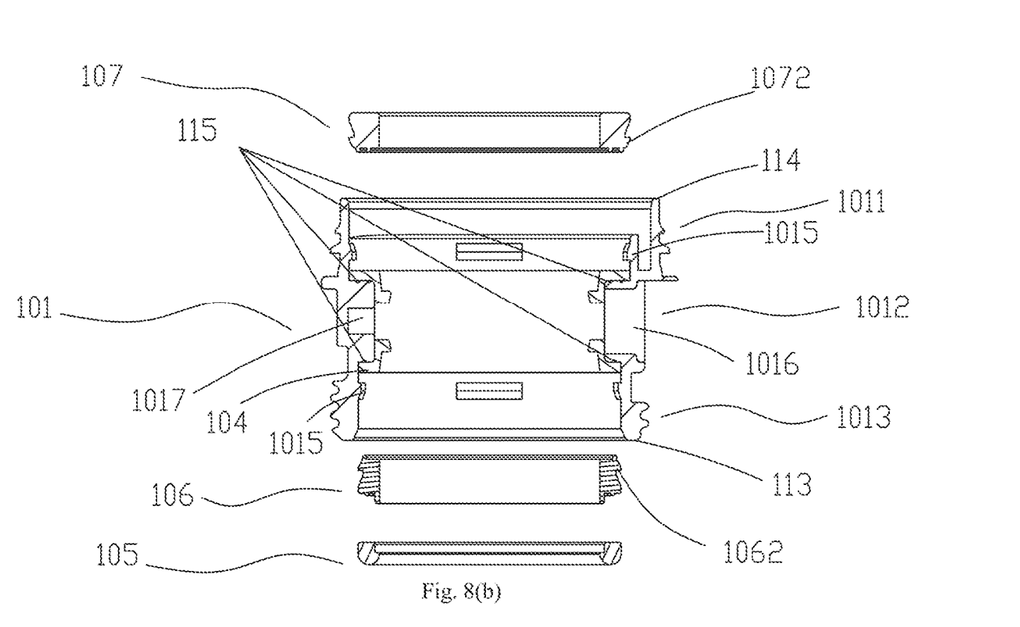
FIG. 8(b) is an axial cross-sectional view of the valve body, the front positioning ring, the rear positioning ring, and the inner valve seat of the butterfly valve according to the present invention.
Figure 9A:
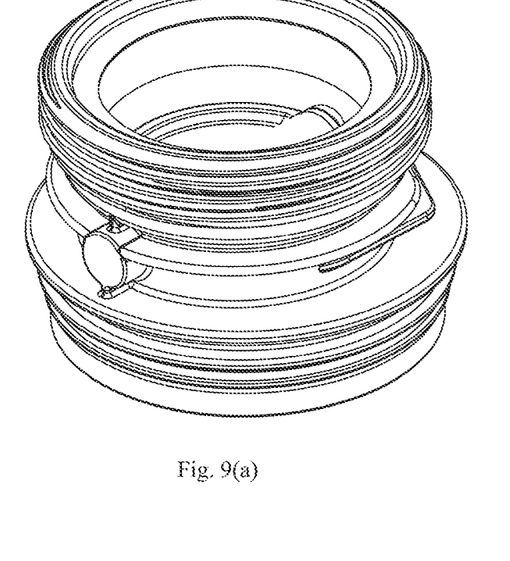
FIG. 9(a) is an assembled perspective view of the valve body, front positioning ring, rear positioning ring, and outer valve seat of the butterfly valve according to the present invention.
Figure 9B:
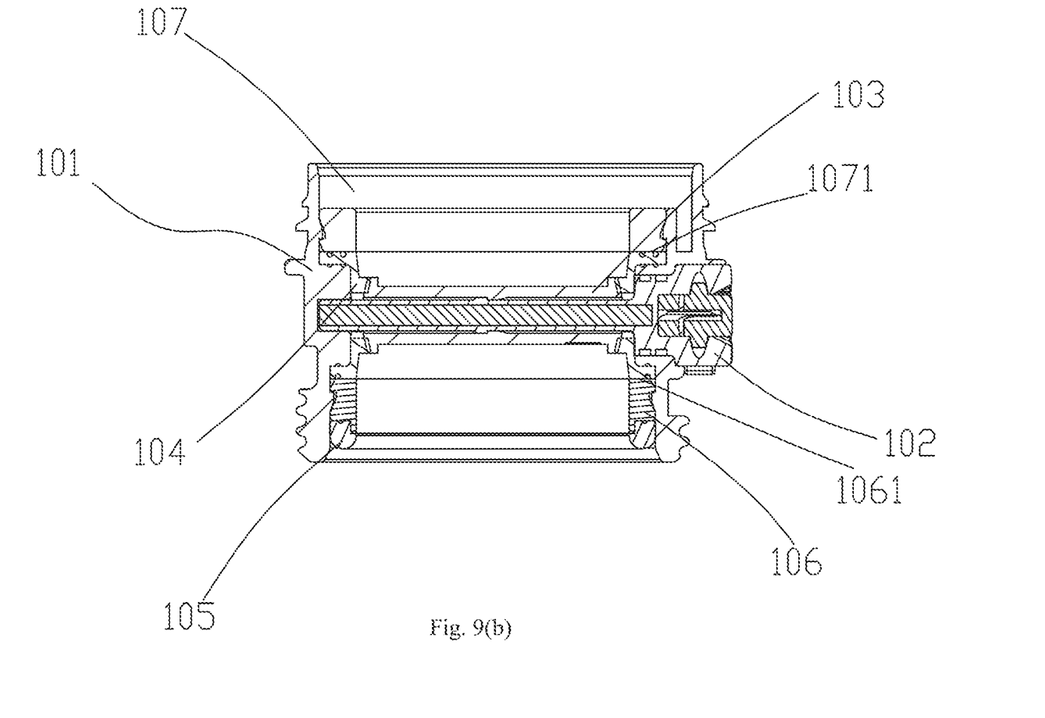
FIG. 9(b) is an assembled axial sectional view of the valve body, front positioning ring, rear positioning ring, and outer valve seat of the butterfly valve according to the present invention.
Figure 10:
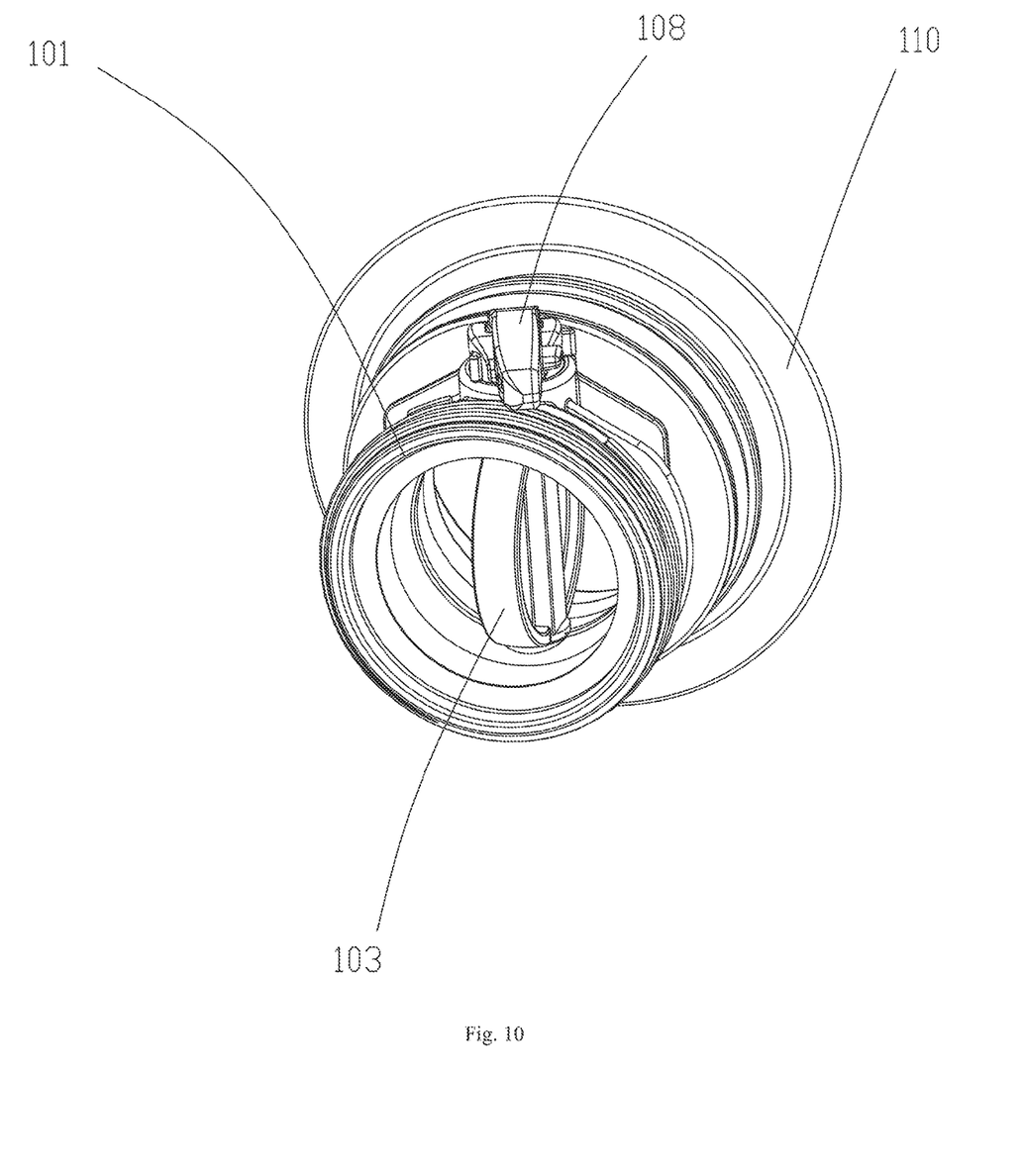
FIG. 10 is a perspective view of the butterfly valve according to the present invention viewed from the front when the valve is opened.

Specifically, further referring to FIGS. 8(a) and 8(b), the valve body 101 is a substantially cylindrical integral structure, and has an outlet end 113, an inlet end 114, and an axial passage communicating with the outlet end 113 and the inlet end 114. The valve body 101 includes a front segment 1011, a middle segment 1012, and a rear segment 1013 that are successively connected to each other. The front segment 1011, the middle segment 1012 and the rear segment 1013 are all substantially cylindrical and have corresponding internal passages to jointly form the internal passage of the valve body 101. The middle segment 1012 forms a valve seat mounting portion for accommodating the inner valve seat 104.

In the illustrated embodiment, the inner diameter of the internal passage of the middle segment 1012 is smaller than the inner diameter of the internal passage of the front segment 1011, and also smaller than the inner diameter of the internal passage of the rear segment 1013. There are sealing surfaces 1014a and 1014b formed by shoulders between the internal passage of the middle segment 1012 and the internal passage of the front segment 1011 as well as between the internal passage of the front segment 1011 and the internal passage of the rear segment 1013, respectively. The sealing surfaces 1014a and 1014b are annular surfaces facing the front side and the rear side, respectively.

Barbs 1015 are provided on the inner surfaces of the internal passages of the front segment 1011 and the rear segment 1013 respectively, so that the front positioning ring 106 and/or the rear positioning ring 107 are/is prevented from exiting from the internal passage when the front positioning ring 106 is mounted into the internal passage of the front segment 1011 from the front side and/or the rear positioning ring 107 is mounted into the internal passage of the rear segment 1013 from the rear side. The barbs 1015 are in the form of, for example, a circumferential ridge facing backward in the front segment 1011 and a circumferential ridge facing forward in the rear segment 1013. In the illustrated embodiment, the front segment 1011 and the rear segment 1013 are each provided with four barbs 1015 spaced apart in the circumferential direction. Of course, other numbers, forms, and arrangements of barbs can also be used, as long as resistance is applied when the front positioning ring 106 and the rear positioning ring 107 are being withdrawn from the valve body 101.

The outer peripheral surfaces of the front segment 1011 and the rear segment 1013 are respectively provided with connection structures for cooperating with the valve cover 111 and the flange 110. In the illustrated embodiment, the connecting structure is an external thread, but it should be understood that the connecting structure may also be other known connecting structures such as snapping protrusions or snapping grooves.

Figure 4A:
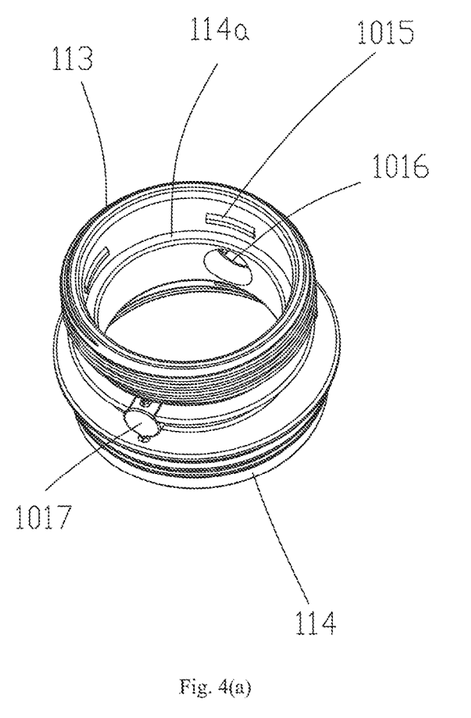
Figure 4B:
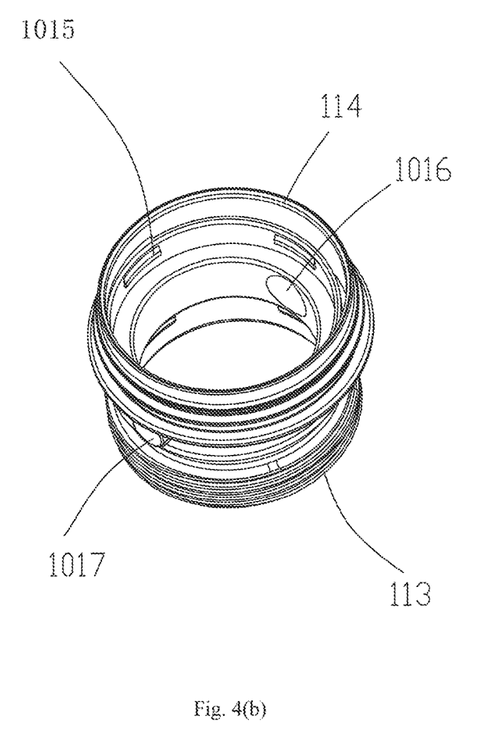

Referring to FIGS. 1,4(*a*)-4(*b*) and 8(*a*)-8(*b*), the circumferential wall of the middle segment 1012 is provided with a radial through hole 1016 for the valve stem 102 to insert. Correspondingly, a counter bore 1017 located in the circumferential wall is provided at a position diametrically opposite to the radial through hole 1016. When the valve stem 102 is inserted therein, the counter bore 1017 is used to accommodate one end of the valve stem 1017.

Figures 7A, 7B:
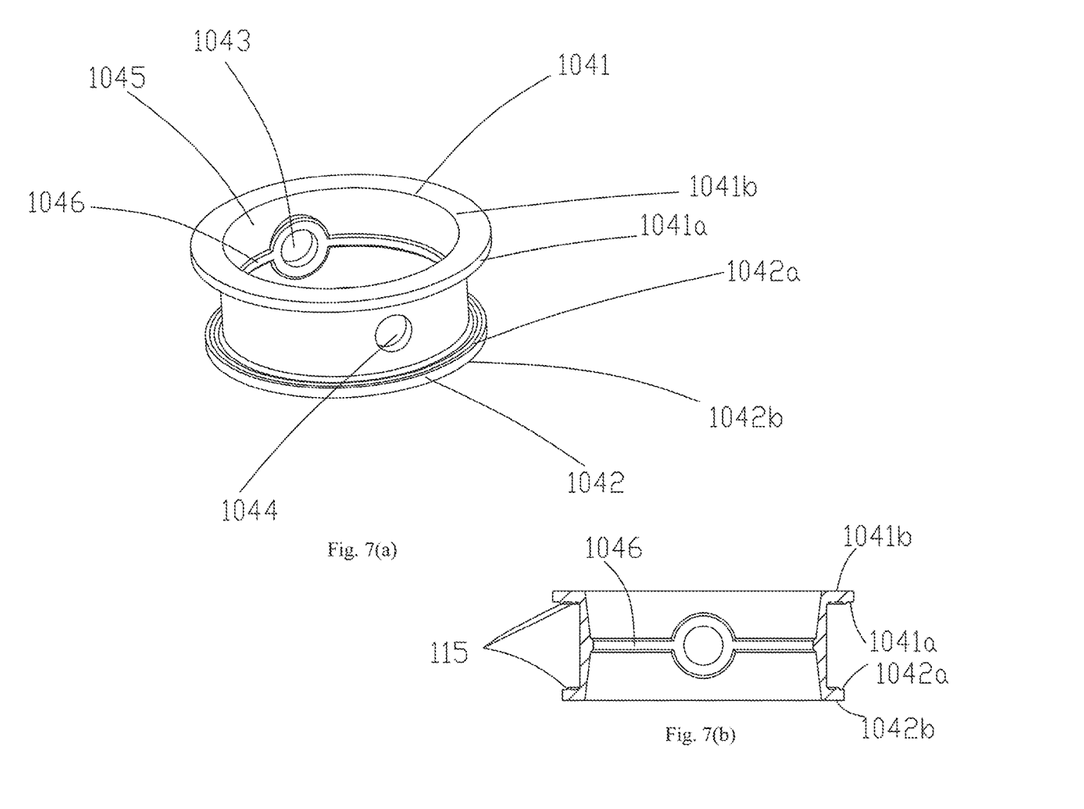
FIG. 7(a) is a perspective view of the valve seat of the butterfly valve according to the present invention viewed from the rear side.
FIG. 7(b) is an axial cross-sectional view of the valve seat of the butterfly valve according to the present invention.

Referring to FIGS. 7(*a*)-7(*b*), the inner valve seat 104 is substantially cylindrical and has two axial ends, namely a rear side end and a front side end. The circumferential wall of the inner valve seat 104 is provided with two diametrically opposite through holes 1043 and 1044 for the valve stem 102 to pass through. The rear side end and the front side end of the inner valve seat 104 are respectively provided with flanges 1041 and 1042 protruding radially outward. Wherein the annular surface 1041*a* facing forward (downward in the figure) of the flange 1041 is used to form a sealing contact with the sealing surface 1014*b* of the valve body 101, and the annular surface 1041*b* facing backward (upward in the figure) is used to form a sealing contact with the sealing surface 1071 (see below) of the rear positioning ring 107. The rearward facing (upward in the figure) annular surface 1042*a* of the flange 1042 is used to form a sealing contact with the sealing surface 1014*a* of the valve body 101, and the forward facing (downwardly in the figure) annular surface 1042*b* is used to form a sealing contact with the sealing surface 1061 of the front positioning ring 106. In each pair of surfaces that form sealing contact with each other: the annular surface 1041*a* and the sealing surface 1014*b*; the annular surface 1041*b* and the sealing surface 1071; the annular surface 1042*a* and the sealing surface 1014*a*; the annular surface 1042*b* and the sealing surface 1061, at least one of which can be provided with a sealing rib 115. In the illustrated embodiment, the annular surface 1041*a*, the annular surface 1042*a*, and the sealing surfaces 1061 and 1071 are provided with sealing ribs 115. The compressed contact between the sealing rib 115 and the corresponding annular surface or sealing surface is able to form a good sealing effect.

A circumferential sealing rib 1046 is also provided on the inner peripheral surface 1045 of the inner valve seat 104. Wherein the centers of the through holes 1042 and 1043 are located on the circle where the circumferential sealing rib 1046 is located. The circumferential sealing rib 1046 extends around the entire outer circumference of the two through holes 1042 and 1043 on the inner circumferential surface 1045 of the inner valve seat 104, as shown in FIG. 7(*a*). The pressure abutment between the circumferential sealing rib 1046 and the valve core sealing surface 1031*a* (described below) of the valve core 103 can form a good sealing effect.

Preferably, in order to facilitate the installation of the inner valve seat 104 in the valve body 101, the flanges 1041 and 1042 of the inner valve seat 104 can be set such that one of the flanges 1041 and 1042 (the flange 1042 is shown in the figure) has a smaller outer diameter, so that the flange with a smaller outer diameter is passed through the valve seat mounting portion of the valve body 101, so that the inner valve seat 104 is mounted in place.

Preferably, in order to facilitate the installation of the valve core 103, the inner peripheral surfaces of the inner valve seat 104 on the front and rear sides of the circumferential sealing rib 1046 may have a tapered shape whose inner diameter slightly enlarged toward both ends.

Figure 6A:
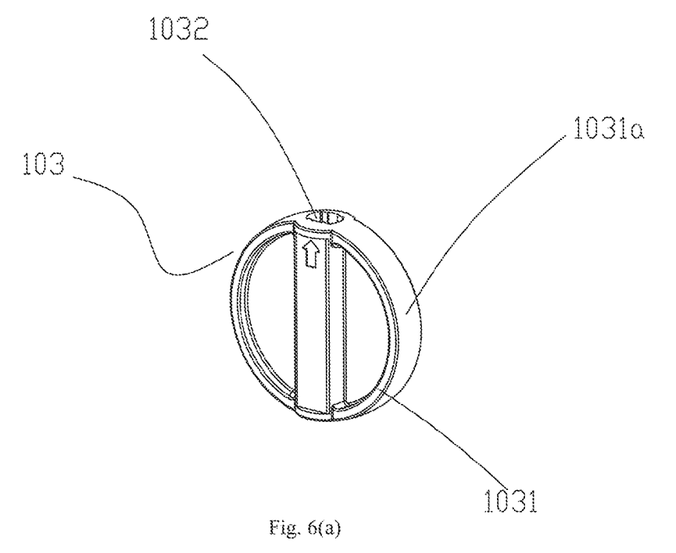
Figure 6B:
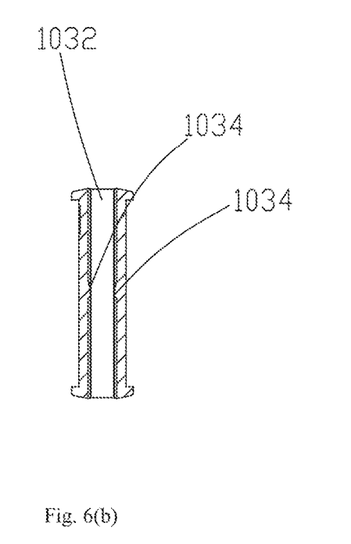

Referring to FIGS. 6(*a*) and 6(*b*), the valve core 103 is a substantially circular plate, and a substantially cylindrical valve rim 1031 is provided around the outer circumference of the circular plate and serves as a valve core sealing surface 1031*a*. In addition, the interior of the valve core 103*a* is provided with a through hole radially passing through its diameter which serves as a valve stem mounting hole 1032. In order to lighten the valve core 103, the circular plate portion of the valve core 103 can be set to be relatively thin, while the portion provided with the valve stem mounting hole 1032 can be relatively thick, thereby forming a valve stem mounting hole 1032 with a relatively large internal dimension. Preferably, a valve core protrusion 1034 is installed on the inner peripheral surface of the valve stem mounting hole 1032. In the illustrated embodiment, there is a pair of valve core protrusions 1034 opposite to each other, but it should be understood that a suitable number of valve core protrusions 1034 can be set at other suitable positions as required.

In the illustrated embodiment, due to the sealing rib 1046 on the inner peripheral surface 1045, the valve core sealing surface 1031*a* can form a sealing contact with the inner peripheral surface 1045 of the inner valve seat 104. However, it should be understood that the sealing ribs may also be arranged on the valve core sealing surface 1031*a* and surround the outer circumference of the valve stem mounting hole 1032 instead of the inner peripheral surface 1045.

Figure 5A:
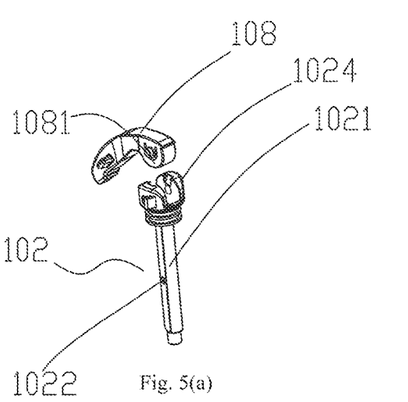
Figure 5B:
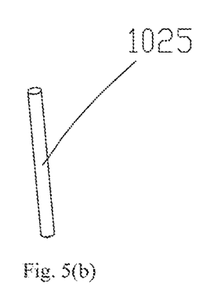
Figure 5C:
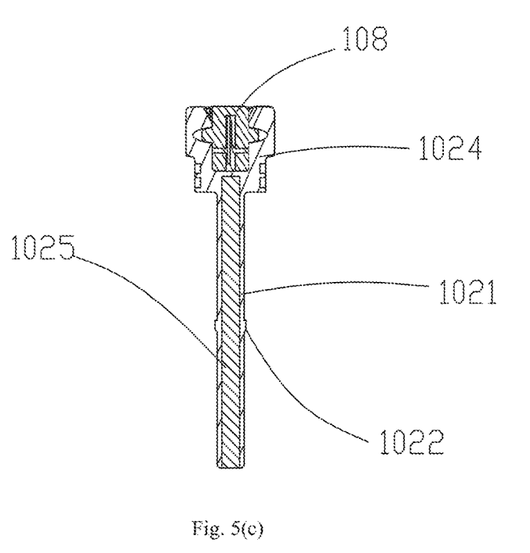

The valve stem mounting hole 1032 is used to accommodate the valve stem 102. FIG. 5(*a*) shows a perspective view of the valve stem 102. The valve stem 102 includes a valve stem body 1021. The cross-sectional shape of the valve stem main body 1021 is complementary to that of the valve stem mounting hole 1032. However, it should be understood that their cross-sectional shape should be a non-circular shape, so that the valve stem 102 cannot rotate in the valve stem mounting hole 1032, thus the rotation of the valve stem 102 is able to drive the valve core 103 to rotate. In the illustrated embodiment, the cross-section of the valve stem body 1021 is substantially rectangular. In addition, a valve stem limiting pit 1022 is provided on the outer peripheral surface of the valve stem main body 1021. The shape of the limiting pit 1022 is substantially complementary with that of the valve core protrusion 1034, and the position and number of the limiting pits 1022 correspond to that of the valve core protrusions 1034. The valve stem 102 and the valve core 103 are assembled together by the cooperation of the valve stem limiting pits 1022 and the valve core protrusions 1034, and they are not easily disengaged from each other after assembled. The valve stem main body 1021 is further provided with an axial hollow passage where a metal pin 1023 is installed, as shown in FIGS. 5(*b*)

and 5(c). Since the metal pin 1023 is assembled in the valve stem 102, in the case of high temperature steam sterilization, it can resist the deformation of the valve core 103 caused by high temperature, so that the sealing performance of the butterfly valve 100 is able to withstand high temperature and high pressure and meet the practical requirements.

The head of the valve stem 102 is provided with a handle receiving structure 1023 which are two protrusions provided with pin holes. The handle 108 has a cam portion 1081 which is installable between two protrusions. Both sides of the cam portion 1081 are provided with pins which is insertable into the pin holes of the handle receiving structure 1023, and the handle 108 is rotatable around the pins. In addition, the rotation of the handle 108 around the longitudinal axis of the valve stem 102 is able to drive the valve stem 102 to rotate, which in turn drives the valve core 103 to rotate to open or close the butterfly valve 100.

Figure 3A:
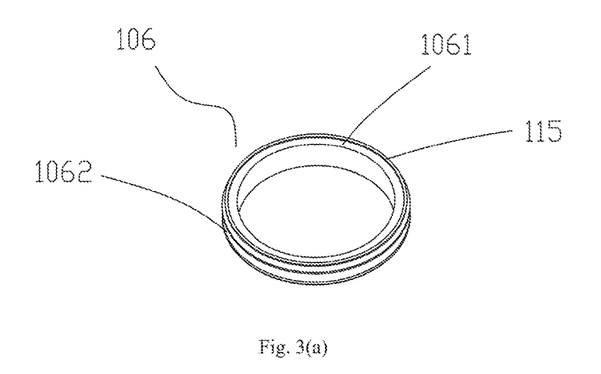
Figure 3B:
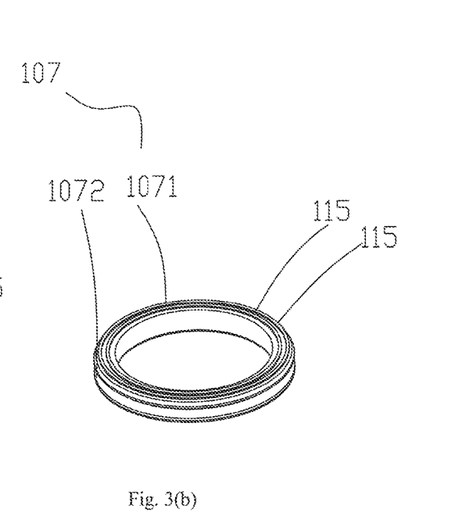

Referring to FIGS. 3(a) and 3(b), perspective views of the front positioning ring 106 and the rear positioning ring 107 are respectively shown. The rear end surface of the front positioning ring 106 is the sealing surface 1061, and the front end surface of the front positioning ring 1071 is the sealing surface 1071. The sealing surfaces 1061 and 1071 are provided with annular sealing ribs 115, and are used to form sealing contact with the annular surface 1042b and the annular surface 1041b of the inner valve seat 104 respectively. However, it should be understood that the annular sealing rib 115 may also be formed on the annular surface 1042b and the annular surface 1041b instead of the sealing surfaces 1061 and 1071. The compressed abutment between the sealing rib 115 and the opposite sealing surface or annular surface can achieve a good sealing effect.

Preferably, shoulders 1062 and 1072 are respectively provided on the outer peripheral surfaces of the front positioning ring 106 and the rear positioning ring 107, as shown in FIGS. 3(a) and 3(b). Further referring to FIG. 8(b), which shows an axial cross-sectional view of the valve body 101, the front positioning ring 106, the rear positioning ring 107, and the inner valve seat 104. Shoulders 1062 and 1072f are shown. The shoulders 1062 and 1072 are in the form of circumferential rings protruding forward and backward respectively, so as to cooperate with the barbs 1015 to prevent the front positioning ring 106 and the rear positioning ring 107 from withdrawing from the valve body 101.

In addition, the front side of the valve body 101 is further provided with a valve cover 111 which is shown in FIG. 1. The valve cover 111 has a circular cover plate 1111 and a circumferential cover edge 1112 extending from the outer periphery of the cover plate 1111 to the rear side. The inner side of the circumferential cover edge 1112 is provided with a connecting structure such as a thread for mating with a matching connecting structure such as a thread on the outer peripheral surface of the valve body 101 to fasten the valve cover 111 to the valve body 101.

More preferably, a tamper-proof buckle 112 may also be provided on the front side of the valve cover 111. In this case, a recess for accommodating the tamper-proof buckle 112 may be provided on the front side of the valve cover 111. The tamper-proof buckle 112 has a main body portion 1121 and two buckle arms 1122 extending from the diametrically opposite positions of the main body portion 1121 to the rear side. The buckle arm 1122 is provided with a hook portion 1123 extending radially inward at the end thereof. Correspondingly, two notches 1113 are provided at the diametrically opposite positions of the circumferential cover edge 1112 of the valve cover 111 for accommodating the two buckle arms 1122. Two cavities may be provided at corresponding positions on the outer peripheral surface of the front side of the valve body 101, which are respectively used to accommodate the hooks 1123 of the two buckle arms 1122. Due to the existence of the tamper-proof buckle 112, the valve cover 111 cannot be removed from the valve body 101 without removing the tamper-proof buckle 112.

Even more preferably, an outer valve seat 105 is also provided between the front positioning ring 106 and the valve cover 111. The outer valve seat 105 is located between the front end surface of the front positioning ring 106 and the valve cover 111 and forms a seal therebetween. In the illustrated embodiment, referring specifically to FIGS. 2 and 8(b), the outer valve seat 105 is generally annular, and its inner peripheral surface is provided with a stepped portion, so as to abut against the front end surface of the front positioning ring 106 and positioned around the front edge of the outer peripheral surface. The outer valve seat 105 is preferably made of an elastic material, when the valve cover 111 is fastened in place on the valve body 101, the outer valve seat 105 is under pressure.

The rear side of the valve body 101 is further provided with a flange 110. The flange 110 is generally cylindrical and has a flange 1101 extending radially outward from the outer peripheral surface of the flange 110. The inner peripheral surface of the flange 110 is provided with a connecting structure such as a thread for matching the connecting structure on the outer peripheral surface of the rear side of the valve body 101 to form a fastening connection. A flange sealing ring 109 is also provided between the flange 110 and the rear end surface of the valve body 101. As shown in FIG. 2, the inner peripheral surface of the flange 110 is provided with an annular groove 1102 for receiving the flange sealing ring 109. When in use, the flange 110 is often fixedly connected to the bulk container by welding or the like. The flange sealing ring 109 is made of elastic material, when the flange 110 and the valve body 101 are fastened in position relative to each other, the flange sealing ring 109 is under pressure.

In the above embodiment, between the sealing surfaces 1014a and 1014b of the valve body 101 and the respective annular surfaces 1042a and 1041a of the inner valve seat 104, between the sealing rib 1046 on the inner peripheral surface 1045 of the inner valve seat 104 and the valve core sealing surfaces 1031a of the valve core 103, as well as between the annular surface 1041b and/or 1042b of the inner valve seat 104 and the respective sealing surface 1071 of the rear positioning ring 107 and/or the sealing surface 1061 of the front positioning ring 106, sealing ribs are provided so as to form a seal between the sealing ribs and the corresponding surfaces, which has a good sealing property and can ensure that no leakage occurs even under high temperature and high pressure. In addition, it is also unnecessary to provide a sealing structure between the valve stem 102 and the valve stem mounting hole 1032 to ensure the sealing of the butterfly valve 100 with respect to the environment.

The preferred embodiments of the present invention have been described in detail above, but it should be understood that, if necessary, aspects of the embodiments can be modified to adopt aspects, features, and concepts of various patents, applications, and publications to provide additional embodiments.

Considering the detailed description above, these and other variations can be made to the embodiments. Generally, in the claims, the terms used should not be construed as limiting the specific embodiments disclosed in the description and claims, but should be construed to include all possible embodiments together with all equivalents to which these claims entitled.

The invention claimed is:

1. A butterfly valve, comprising:
a valve body being an integral structure and having an inlet end, an outlet end, and an axial passage communicating with the inlet end and the outlet end, wherein the valve body is provided with a valve stem mounting hole in a radial direction between the inlet end and the outlet end, the interior of the valve body is provided with a valve seat mounting portion at a position corresponding to the valve stem mounting hole;
an inner valve seat fixedly mounted to the valve seat mounting portion, wherein the inner valve seat is cylindrical, and a radial through hole corresponding to the valve stem mounting hole is provided with in a side wall of the inner valve seat;
a valve core being a plate-shaped member and mounted in the inner valve seat, wherein a radial through hole is provided inside the plate-shaped member;
a valve stem passing through the valve stem mounting hole, the through hole of the inner valve seat and the through hole of the valve core successively; and
two positioning rings separately formed from the inner valve seat and mounted only at axial sides of the inner valve seat entirely inside the valve body and forming a hermetic connection with the inner valve seat;
wherein the axial sides of the inner valve seat are a rear side end and a front side end of the inner valve seat, and wherein the two positioning rings are respectively hermetically connected with the front side end and the rear side end of the inner valve seat.

2. The butterfly valve according to claim 1, wherein a hermetic connection is formed between the inner valve seat and the valve body.

3. The butterfly valve according to claim 1, wherein the positioning rings are arranged such that the valve body and the inner valve seat form a hermetic connection under action of the positioning rings.

4. The butterfly valve according to claim 1, wherein the positioning rings are arranged to exert a squeezing force to the inner valve seat.

5. The butterfly valve according to claim 1, wherein a shoulder is provided on an outer peripheral surface of the positioning rings, and a barb cooperating with the shoulder is provided inside the valve body.

6. The butterfly valve according to claim 1, wherein the valve body is cylindrical and has a front segment, a middle segment and a rear segment, wherein the inner diameter of the internal passage of the middle segment is smaller than that of the front segment and the rear segment, and sealing surfaces formed by shoulders are respectively provided between the internal passage of the middle segment and the internal passage of the front segment and between the internal passage of the middle segment and the internal passages of the rear segment respectively.

7. The butterfly valve according to claim 1, wherein a metal pin extending along the axial direction of the valve stem is inserted inside the valve stem.

8. A butterfly valve, comprising:
a valve body being an integral structure and having an inlet end, an outlet end, and an axial passage communicating with the inlet end and the outlet end, wherein the valve body is provided with a valve stem mounting hole in a radial direction between the inlet end and the outlet end, the interior of the valve body is provided with a valve seat mounting portion at a position corresponding to the valve stem mounting hole;
an inner valve seat fixedly mounted to the valve seat mounting portion, wherein the inner valve seat is cylindrical, and a radial through hole corresponding to the valve stem mounting hole is provided with in a side wall of the inner valve seat;
a valve core being a plate-shaped member and mounted in the inner valve seat, wherein a radial through hole is provided inside the plate-shaped member;
a valve stem passing through the valve stem mounting hole, the through hole of the inner valve seat and the through hole of the valve core successively; and
two positioning rings separately formed from the inner valve seat and mounted only at axial sides of the inner valve seat entirely inside the valve body and forming a hermetic connection with the inner valve seat,
wherein the valve body is provided with a sealing surface, the inner valve seat is provided with a sealing rib cooperating with the sealing surface of the valve body, the inner valve seat is also provided with a sealing surface, and the positioning rings are provided with sealing ribs cooperating with the sealing surface of the inner valve seat.

9. A butterfly valve, comprising:
a valve body being an integral structure and having an inlet end, an outlet end, and an axial passage communicating with the inlet end and the outlet end, wherein the valve body is provided with a valve stem mounting hole in a radial direction between the inlet end and the outlet end, the interior of the valve body is provided with a valve seat mounting portion at a position corresponding to the valve stem mounting hole;
an inner valve seat fixedly mounted to the valve seat mounting portion, wherein the inner valve seat is cylindrical, and a radial through hole corresponding to the valve stem mounting hole is provided with in a side wall of the inner valve seat;
a valve core being a plate-shaped member and mounted in the inner valve seat, wherein a radial through hole is provided inside the plate-shaped member;
a valve stem passing through the valve stem mounting hole, the through hole of the inner valve seat and the through hole of the valve core successively; and
two positioning rings separately formed from the inner valve seat and mounted only at axial sides of the inner valve seat entirely inside the valve body and forming a hermetic connection with the inner valve seat,
wherein the valve body is provided with sealing surfaces, the axial sides are a rear side end and a front side end of the inner valve seat, and the two positioning rings are respectively provided on the rear side end and the front side end of the inner valve seat, wherein both the rear side end and the front side end of the inner valve seat are provided with flanges protruding radially outward, an annular surface on one side of each of the flanges forms a sealing contact with the sealing surfaces of the valve body respectively, and the other side of each of the flanges forms a sealing contact with sealing surfaces of the positioning rings.

10. The butterfly valve according to claim 9, wherein sealing ribs are provided on the annular surface of the flanges that forms the sealing contact with the valve body, and the sealing surfaces of the positioning rings facing toward each of the flanges are provided with sealing ribs.

* * * * *